(12) United States Patent
Bosshardt et al.

(10) Patent No.: US 7,022,277 B2
(45) Date of Patent: Apr. 4, 2006

(54) METHOD FOR PRODUCING PLASTIC ASSEMBLY PARTS

(75) Inventors: Michel Bosshardt, Sainte-Menehould (FR); Bertrand Gruau, Braux Sainte Cohiere (FR)

(73) Assignee: CEBAL S.A.S, Clichy (FR)

( * ) Notice: Subject to any disclaimer, the term of this patent is extended or adjusted under 35 U.S.C. 154(b) by 220 days.

(21) Appl. No.: 10/466,543

(22) PCT Filed: Feb. 25, 2002

(86) PCT No.: PCT/FR02/00686

§ 371 (c)(1), (2), (4) Date: Jul. 29, 2003

(87) PCT Pub. No.: WO02/068171

PCT Pub. Date: Sep. 6, 2002

(65) Prior Publication Data

US 2004/0061256 A1    Apr. 1, 2004

(30) Foreign Application Priority Data

Feb. 26, 2001   (FR) .................................. 01 02574

(51) Int. Cl.
- *B28B 7/22* (2006.01)
- *B28B 3/06* (2006.01)
- *B28B 5/00* (2006.01)

(52) U.S. Cl. ...................... 264/242; 264/263; 264/264; 264/255; 264/267; 264/268; 264/297.2

(58) Field of Classification Search ................ 264/268, 264/267, 242, 264, 255, 263, 297.2
See application file for complete search history.

(56) References Cited

U.S. PATENT DOCUMENTS

| 3,281,295 | A | * | 10/1966 | Capucio | 156/69 |
| 4,021,524 | A | * | 5/1977 | Grimsley | 264/242 |
| 4,205,028 | A | * | 5/1980 | Brueggemann et al. | 264/440 |
| 4,314,799 | A | * | 2/1982 | Amberg et al. | 425/296 |
| 6,129,880 | A | * | 10/2000 | Kieras et al. | 264/230 |

FOREIGN PATENT DOCUMENTS

| GB | 2050236 | 1/1981 |
| WO | 9746362 | 12/1997 |

* cited by examiner

*Primary Examiner*—Stephen J. Lechert, Jr.
(74) *Attorney, Agent, or Firm*—Dennison, Schultz, Dougherty & MacDonald

(57) ABSTRACT

The invention relates to a method for producing objects and object parts formed by an assembly comprising at least two plastic parts (10 and 5; 10' and 5'), which can move in relation to one another with at least one degree of freedom and which are provided with surfaces having at least partially complementary shapes such that, in at least one geometric configuration, they are solidly interconnected on a common surface (11; 11') in close, clearance-free contact The inventive method comprises the following steps: 1) molding of a first part (10, 10') by compression or injection; 2) removal of the second tool, the first part (10, 10') remaining solidly connected to the first tool which serves as a piece of support equipment or is installed on a piece of support equipment (60); 3) compression molding of the second part using the whole (110) of the first part which is integral to the support equipment and a third tool; 4) removal of the first support tool (60) and the third tool (55) and extraction of the assembly (200) thus formed.

15 Claims, 3 Drawing Sheets

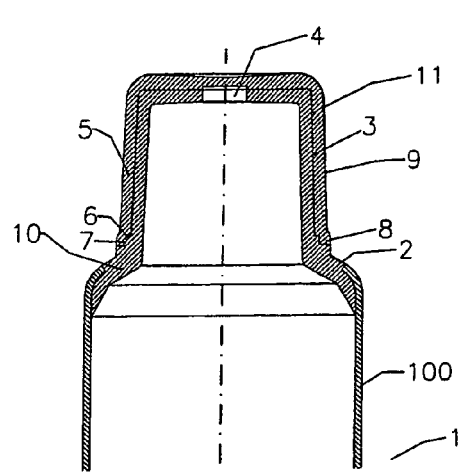
Fig. 1
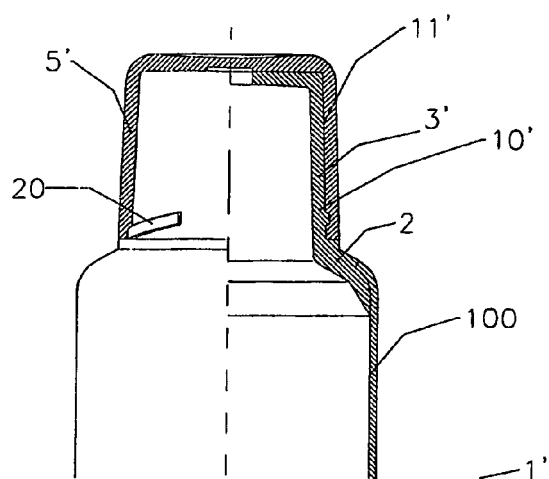
Fig. 2
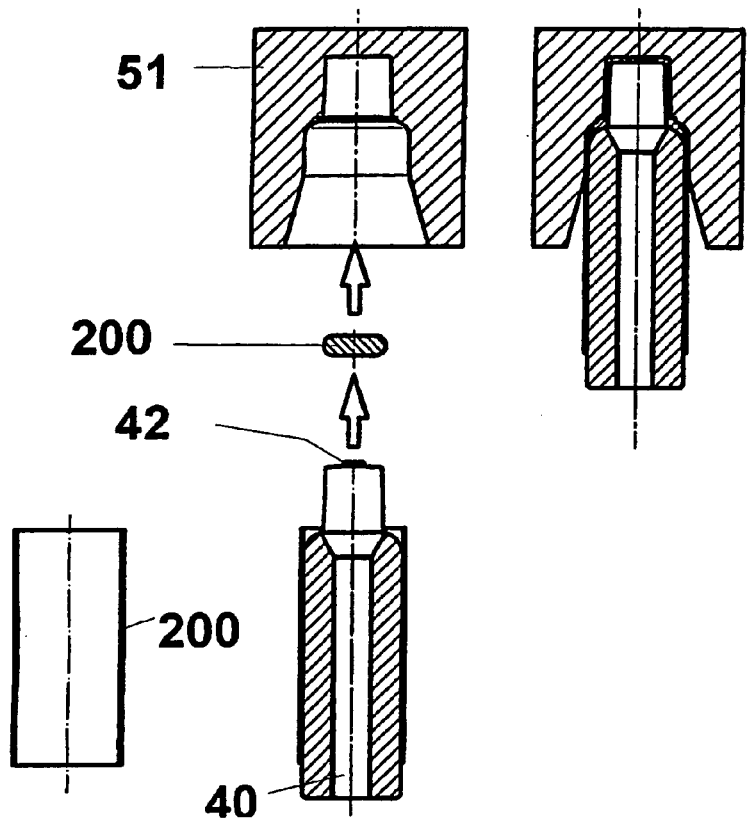
Fig. 3.1

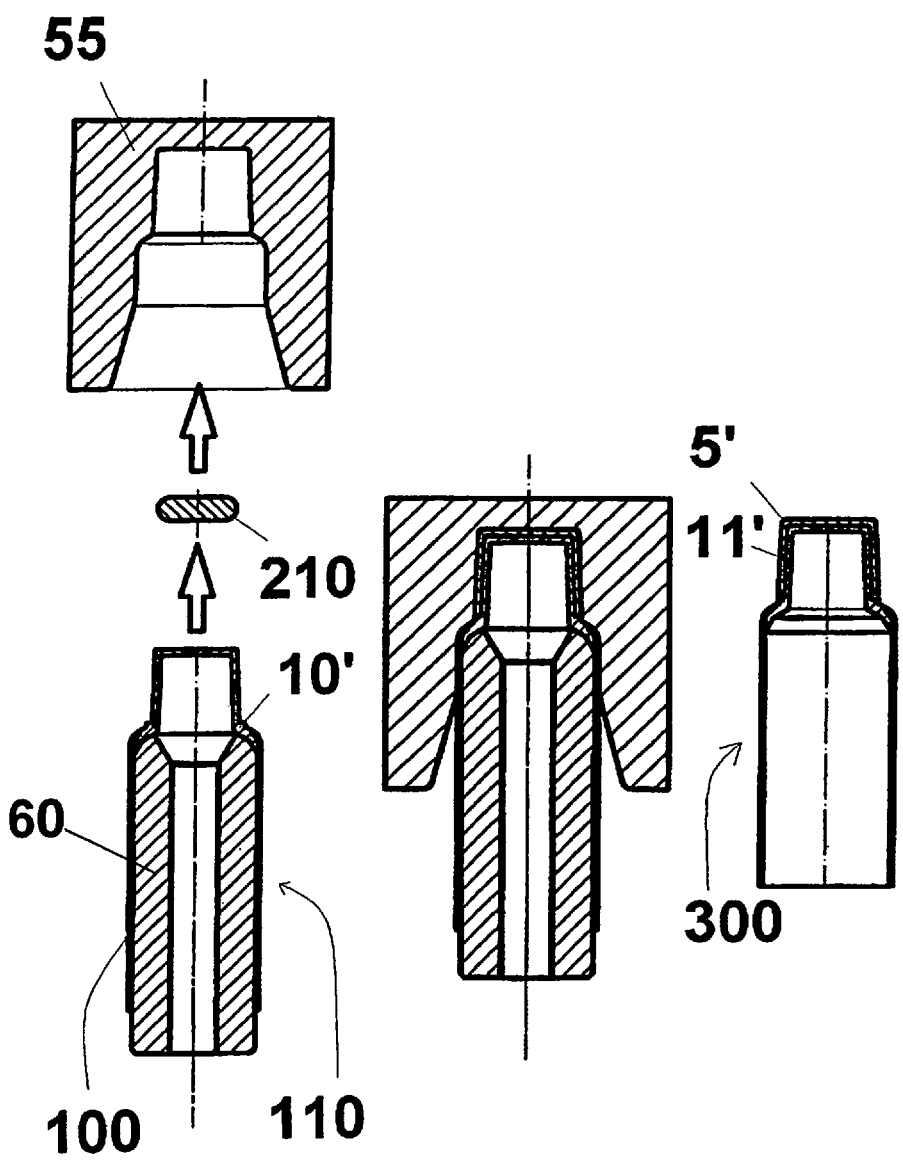
Fig. 3.2   Fig. 3.3   Fig. 3.4

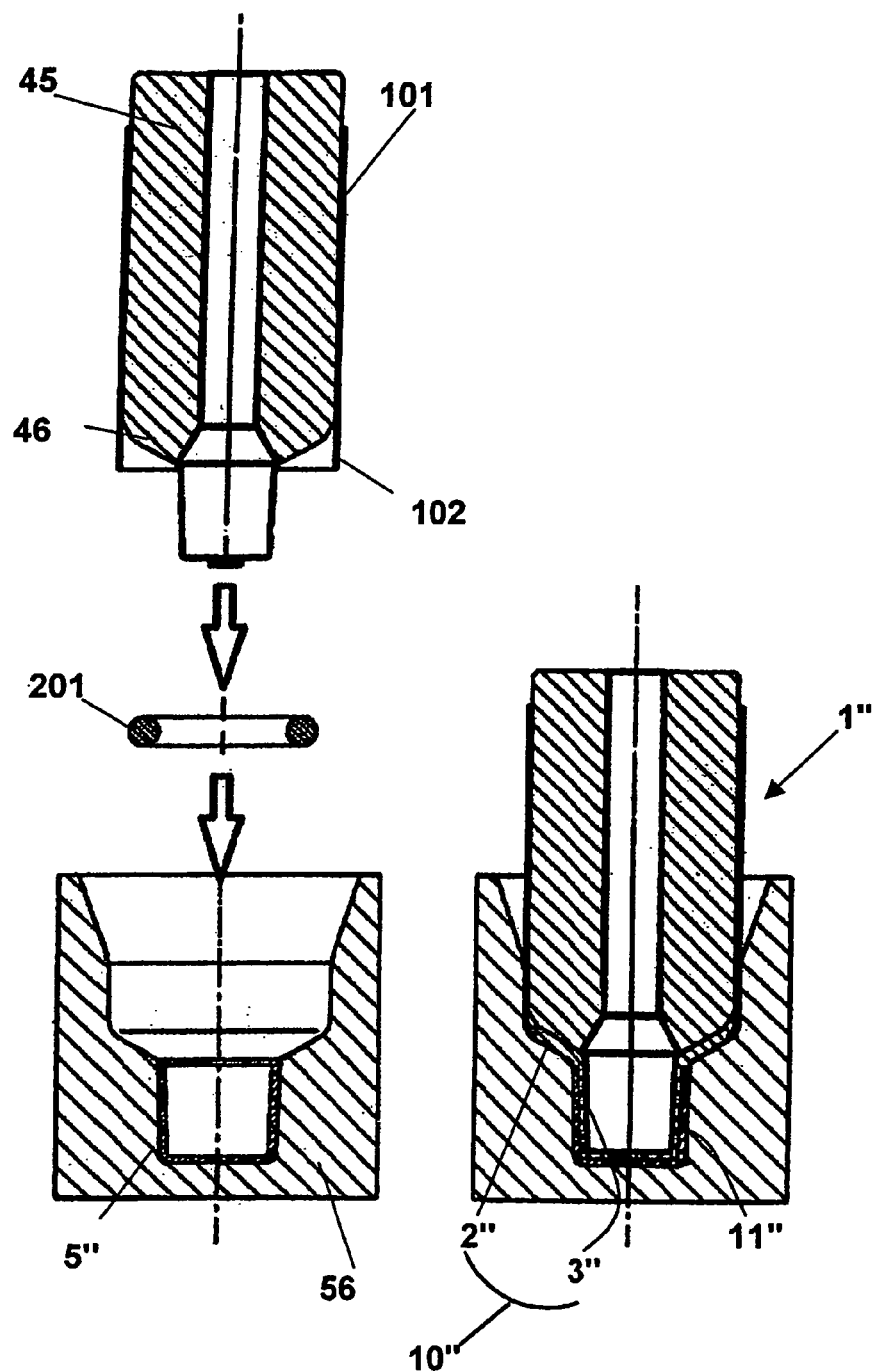
Fig. 4.1  Fig. 4.2

METHOD FOR PRODUCING PLASTIC ASSEMBLY PARTS

This application is a filing under 35 USC 371 of PCT/FR02/00686, filed Feb. 25, 2002.

FIELD OF THE INVENTION

This invention relates to a method for high rate production of assemblies composed of at least two plastic parts, which can move in relation to one another, and which have complementary shaped contact surfaces such that they are located in at least one geometric configuration in which they are solidly interconnected on a common surface in close, clearance-free contact.

DESCRIPTION OF RELATED ART

This type of assembly is used in a large number of objects, for example objects comprising two parts temporarily fixed together by screwing or click fitting, such as flexible tubes provided with their closures, or more generally receptacle heads provided with their sealing caps, or objects with elements such as ball joints, hinges, perforated rotating covers or tops, free to rotate with respect to each other, or sliding elements such as syringe pistons, slides for makeup boxes or zip fasteners.

Parts used for some of these assemblies, and particularly parts that do not concern ball joints or hinges, are usually made separately and then assembled. Operations for separate fabrication of parts require specific machines for forming them and then transferring them to the assembly installation. For many years, attempts have been made to reduce the cost price and to increase the production rate of this type of assembly by attempting to form the parts in the same fabrication cycle without needing to assemble them.

DE 19 41 479, EP 0 073 356, U.S. Pat. No. 3,281,295, WO 91 01213, JP 61 047223 describe various production methods that consist of making a first part using a mould made of at least two parts, removing the second part of the mould by keeping the fixed portion of the first part of the mould and then insert moulding the second part by injection. Thus, a second plastic material is injected into a volume delimited firstly by the impression of a new mould that comes into contact with the first part that is still fixed to the first portion of the first mould, and secondly by a portion of the surface of the first part used as a mould. The plastic material from which the second part is made necessarily had a lower melting point than the plastic material from which the first part is made. Patent application WO 97/46362 filed by the applicant of this patent disclosed a process in the same category but that used some particular geometric features of the parts to be made, through which it was no longer necessary to impose this type of constraint on the plastic material.

FR 2 451 867 describes a method for producing a flexible tube comprising a neck surrounding a distribution orifice and provided with a closure, characterised in that a flexible tube is used in which the external surface is covered by a metallic sheet and in which the said flexible tube is slid onto a punch that acts as a support and closes the distribution orifice, a female die is placed facing the said neck that acts as a male die, the molten plastic resin is inserted in the female die and the said molten resin is compressed in the impression formed by the female die and the neck.

All the methods described above, except for the last method, use injection insert moulding for the second part of the assembly. This imposes a fairly limited choice for the second plastic material; its melt index must be fairly high so that the cavity between the second mould and the portion of the surface of the first part used as a mould can be filled under satisfactory conditions. It is well known that a high melt index usually corresponds to fairly low mechanical characteristics (instantaneous characteristics and resistance to fatigue), and particularly a fairly high sensitivity to stress cracking.

The most recent method according to the prior art described in this application is a compression moulding method, but it requires the use of a flexible tube for which the external surface is covered by a metallic sheet.

Therefore, the applicant attempted to develop a method for forming this type of assembly in which the two parts can be entirely made of plastic material(s) and that enables a wider range of possible choices of plastic materials for the second part.

SUMMARY OF THE INVENTION

The purpose of the invention is a method for producing objects or parts of objects consisting of an assembly comprising at least two plastic parts which can move in relation to one another, with at least one degree of freedom and for which the corresponding surfaces match (at least partially) with complementary shapes such that there is at least one geometric configuration in which they are solidly interconnected on a common surface in a close, clearance-free contact, characterised in that it comprises the following steps:

a) moulding of a first part made of one or more plastic materials by injection or compression resulting from bringing a first tool and a second tool towards each other, the impression of the second tool including the said common surface, the combined impressions of the two tools delimiting the volume of the said first part at the end of the closing movement;

b) separation of the said second tool, the first part remaining fixed with the said first tool that then acts as support tool;

c) production of a blank consisting of a determined quantity of one or more thermoplastic materials that are immiscible with the said plastic material(s) in the first part, the said blank being brought to a temperature higher than the softening temperature of the said thermoplastic material(s) from which it is made;

d) deposition of the said blank on the surface of the assembly of the first part fixed to the support tool or in the impression of a third moulding tool;

e) placement of the said third tool facing the first part fixed to the support tool assembly, the said third tool having an impression that, with the said surface of the first part and possibly part of the impression of the support tool, delimits the volume of the second part as it comes into contact with the said first part fixed to the support tool assembly;

f) the said assemblies of the first fixed part of the support tool and the third tool are brought towards each other until they come into contact, the said closing movement causing compression of the blank until the required shape of the second part is obtained;

g) separation of the support tool and the third tool, and then extraction of the assembly of the two parts thus formed.

Step a) forms part of a conventional forming method such as injection moulding or co-injection of one or more thermoplastic materials or compression moulding of a thermoplastic or thermosetting material. Both of these methods require the first and second tools to be brought towards each other, either before injection or during compression.

After forming, the second tool is moved apart and the first part is either extracted from the assembly or held in position on the first tool.

If the first part is extracted from the assembly formed by the first and second tools, to follow intermediate steps that do not form part of this invention, it is then re-inserted on a support tool that has a contact surface with the first part mechanically equivalent to the contact surface that existed between the first tool and the first part. It is put into place on the support tool such that the said common surface always faces outwards, so that this common surface can act as part of a mould impression for the second part. The contact surface is said to be mechanically equivalent to the contact surface that existed with the first tool, in the sense that it is a visible surface with a similar extent, such that the mechanical support provided by the support tool is identical to the support that could have been provided by the first tool. Therefore, it is not necessarily a genuinely identical surface, in that the roughness and the micro-roughnesses only have a minimum effect under support conditions.

If the first part is held in position on the first tool, the first tool may be cooled to accelerate cooling of the first part and acts as support tool for the remainder of the process. The terms "first tool" and "support tool" are synonymous for the rest of the description of the steps of the process according to the invention.

Therefore, the first part is put into place on its support tool and will participate in forming a female die for formation of the second part. The support tool may also comprise a portion that will be used as an impression to form a portion of the second part located outside the common surface. If the support tool is the first tool, this part of the impression must be closed off while the first part is being formed. For example, the first part could be injection moulded, by closing off the said part of the impression of the first tool with the second tool.

Furthermore, a blank of the second part is made, composed of a determined quantity of one or more thermoplastic materials immiscible with the plastic material(s) from which the first part is made. All that is necessary is that the plastic material(s) near the periphery of the blank must be immiscible with the plastic material(s) near the periphery of the first part. The quantity of plastic material(s) is determined in advance, because the volume of the blank must be approximately the same as the volume of the second part. For example, it can be obtained by extrusion or co-extrusion, this process being a means of satisfactorily controlling the quantity of material used in the blank.

Preferably, the periphery of the first part is made of a first plastic part and the periphery of the blank is made from a second plastic material, immiscible with the first plastic material. The pairs of materials that will come into contact and are recommended according to the invention are thermoplastics that are immiscible with each other. Preferably, we will choose one of the polypropylene-polyethylene, polyester-polyethylene, polyester-polypropylene, polyamide-polypropylene, polyamide-polyethylene pairs.

In another embodiment of the invention, the blank is obtained by co-extrusion of several plastic materials, the second plastic material surrounding a plastic material with improved barrier properties, such as an EVOH (ethylene-vinyl alcohol) copolymer, or a polyamide.

One of the plastic materials obtained by extrusion may comprise a filler typically composed of calcium carbonate or mica particles, or nanoparticles of clays such as montmorillonite.

The said blank is deposited on the surface of the assembly of the first part and the support tool acting as a moulding impression or in the impression of a third moulding tool. Preferably, for size reasons, this deposition is done before the third tool is brought in front of the assembly of the first part fixed to the support tool. The choice of the deposition location depends on the implementation means selected. For example, if it is decided to make the blank by (co)extrusion, it is preferable to place the first part fixed to the support tool assembly facing the extruder. A taking-off system can then be used that will pick up a dab of a (co)extruded plastic material with a determined weight at the exit from the die and deposit it by gravity on the lower tool (first part and support tool assembly in our example).

The third tool is brought in front of the first part and the first tool assembly. Obviously, this is just a relative movement; either the second and third tools, or the assembly of the first tool and the first part, may be moved depending on which implementation means is chosen. This third tool contains an impression that, when it comes into contact with the first tool and the first part assembly, cooperates with the said surface of the first part to delimit the volume of the second part. A portion of the impression formed in the first tool that was closed off by the second tool while the first part was being formed may also be used to delimit the volume of the second part. The closing movement between the tool and the assembly of the first part fixed to the support tool results in compression of the blank trapped in the air gap between the impression of the third tool and the surface of the first part fixed to the support tool assembly that acts as a complementary impression and contains the common surface.

The blank is compressed until the required shape of the second part is obtained. The next step is to separate the support tool and the third tool. The assembly of the two parts thus formed may be extracted directly or may remain fixed to one of the tools during cooling.

The assembly obtained is in the geometric configuration described above in which the first parts are solidly interconnected on a common surface in close, clearance-free contact. The first part will act as a partial female die, with this common surface. The said common surface may comprise more or less pronounced relief. The term "close, clearance-free contact" does not imply a continuous bond at the micro-roughnesses, but it does define a contact quality that could not be obtained otherwise under economically satisfactory conditions, and in any case better than the quality that could be obtained by separate and painstaking machining of the parts to be brought into contact. "Clearance-free" can be considered as being an average distance of not more than 10 μm separating the two surfaces.

Once the assembly has been extracted, the parts are designed to be separated, preferably by the final user himself; in this case, it is essential that this separation takes place under acceptable conditions with a force to be applied that is neither too high nor too low and without tearing or without accidental creation of any irregular and random relief on the common contact surface, which often needs to be a temporarily leak tight contact surface.

The last phase in removing the second part from its mould consists of relative displacement of one part or portion of a part with respect to the other; all that is necessary is to move each of the portions of the part close to the common contact surface. This displacement is preferably done after thermal and dimensional stabilisation is complete, the ideal being to include it in an operation normally carried out by the final user. But he should not need to apply any additional force to achieve this.

Preferably, the assembly thus formed is allowed to cool and then a pause is left until the two plastic materials have fully stabilised before one part is moved relative to the other part. In a way, this displacement forms the second phase in removal of the second part from its mould. Since the second part is obtained by compression of a blank to which a relatively low temperature is applied, complete stabilisation of the assembly is fairly fast. This does not make it impossible to carry out complementary fabrication operations with the assembly of the two parts, kept fixed to each other during this cooling period.

Thus, if the flexible tubes are fitted with their caps, they can be filled with the product that they are designed to contain. The head of the tube fitted with its cap using this process is welded onto a flexible skirt and the assembly is turned over so that the said product can be added into it without it being necessary to wait until the plastic materials have fully stabilised. The final user himself will perform the final phase of removing the cap from the mould when he unscrews the cap, the first time that the tube is opened.

A variant of the previous particular method consists of making the tube composed of a cylindrical flexible part and a head, the head being moulded as the first part, by injection or compression of plastic material(s) welded onto the end of the tube skirt by autogenic welding during moulding.

Another variant consists in moulding a closure as the first part, putting it inside a female die acting as a support tool and bringing a punch fitted with a skirt to face this assembly, the end of the skirt projecting slightly beyond the shoulder of the punch. The shape of the punch is such that when it comes into contact with the female die, fitted with its closure, the surface of its end and the surface of the impression of the female die fitted with its closure delimit the volume of the tube head to be made. The projecting end of the skirt is trapped in this volume. A blank is placed in the air gap between the punch fitted with its skirt and the female die fitted with its closure and the punch and the female die are moved towards each other until they come into contact. The head is thus obtained by moulding compression and is autogenically welded to the skirt during the said moulding process.

Complete stabilisation of immiscible plastic materials can cause an increase in the loosening torque, for example as a result of differential expansions. There are two possible ways of overcoming this problem, that may be used together and have been used successfully; the constituent materials may be varied, or the geometry of the surfaces may be varied, and particularly the details of these surfaces. Frequently, the complementary contact surfaces are provided with temporary means of fixing the two parts, such as threads, and the shape of the surfaces can be varied; if judiciously arranged, these threads can efficiently participate in the final mould removal operation of the second part, by separating the two surfaces. They are fast, multiple, conical and shallow threads. They may be short and do not need to extend around the entire common contact surface. This type of means creates roughness on the common surface and their geometry must be designed such that they are subjected to minimum deformation during compression. Their geometry will be described in detail in the examples given below.

In general, and surprisingly, compression insert moulding tolerates the presence of relief or roughness on the common surface better than injection insert moulding. It might be thought that as a result of the lower average working temperature, the forces involved during compression would be higher, which should have resulted in greater deformation of the roughness formed on the common surface, entrained by the flow of the second plastic material. In fact this is not the case, at least for the geometries tested and described below.

It has been observed that the relatively slight roughness formed on the surface of the first part corresponding to the common surface (height/base ratio of up to 1) and with fairly sharp angles (fillet radii close to 2/10 mm) maintain their geometry and their sharp angles perfectly after compression of the second part. This is undoubtedly due to the fact that the temperature of these rough parts is lower and that they tend to deform less than the central part of the blank during compression, and particularly due to the fact that the air gap between the said common surface and the third tool is much wider than the air gap encountered by the plastic material when it is injected, from the beginning of compression until when the tools come into contact. The result is that shear forces are much lower than for injection and this is probably the reason why rough surfaces are relatively controlled during compression.

This type of behaviour is particularly advantageous when a second thin part has to be overmoulded, typically less than 2 mm thick. This applies well to tubes fitted with their closures for which the second moulded part may be either the closure, or the head of the tube. Another good reason for the good mechanical behaviour of the surface of the first part in this case is the fact that the first part is also thin (less than 2 mm thick) and that it therefore has an efficient mechanical support.

If it is impossible to form threads on the surfaces bearing on the common surface, or if these threads have to satisfy precise standards, it is possible to vary one and/or the other of the plastic materials by incorporating sliding agents such as zinc stearate into them.

In order to reduce the force necessary to separate the two parts, it is also possible to vary the influence of the content of fillers (mica, calcium carbonate, kaolin, aluminium hydroxide, etc.) in a plastic material, on its shrinkage; in general, the tendency of a material to shrink reduces as the filler content in the plastic material increases. Therefore, this filler content can vary from a few percent (no filler) to zero percent. Therefore, if these filler contents can be varied, it is possible to increase the shrinkage (case in which the second overmoulded part has a convex surface on the common surface) or to reduce the shrinkage (case in which the second overmoulded part has a concave surface on the common surface).

Concerning the neck-cap assemblies, the use of zinc stearate is not recommended in the pharmaceutical, parapharmaceutical or cosmetic fields. In this case, a neck-cap surface provided with a thread can be designed, making the shape of the neck and cap contact surfaces cylindrical, but with an elliptical orthogonal section, the ratio of the small axis to the large axis remaining greater than a critical value. Below this value, it is impossible to avoid irreversible plastic deformation of the surfaces. In the case of polypropylene closures moulded on polyethylene necks, the average diameter of these closures is between 15 and 45 millimetres and the skirt thickness is between 0.5 and 2 millimetres, and the ratio of the small axis to the large axis must remain larger than 0.9.

This principle may be generalised to include geometries other than the neck-cap pairs; when the relative displacement of one part with respect to the other is such that there is a rotation axis, and this axis coincides with an axis of symmetry of the common contact surface, when this rotation does not perform a specific functional and permanent role in the assembly (the case of hinges or ball joints), it is possible to organise things such that this axis is an axis of axisymmetry; thus, the rotation inevitably causes global elastic deformation of these parts and this overall deformation contributes to separation of the two surfaces.

There are many possible embodiments, in most cases the materials used for the two parts and/or the geometry of their common contact surface can be chosen such that the second part can be separated from the first part. This process can create a remarkable leak tightness, that has never been seen before on parts made at a high production rate.

Once detached, the said second part will once again be assembled with the first part, while remaining mobile with respect to the first part, but it may remain in a position in which their contact is made on the said common surface.

BRIEF DESCRIPTION OF THE DRAWINGS

Other characteristics and advantages will become clear in the description of particular devices according to the invention given below as examples, that are in no way limitative.

FIG. 1 shows an axial section through a tube head fitted with a compression overmoulded closure, that may or may not be provided with screwing means.

FIG. 2 shows an axial section through a tube head provided with a compression overmoulded closure provided with a screwing thread, which is only formed over the base of the neck.

FIGS. 3.1, 3.2, 3.3 and 3.4 illustrate axial sections showing steps in the production method according to the invention used to make the tube head shown in FIG. 2 with the screwing thread not shown.

FIGS. 4.1 and 4.2 show axial sections illustrating steps in another variant of the production method according to the invention.

DESCRIPTION OF THE PREFERRED EMBODIMENTS

The examples illustrate a few manufacturing variants of flexible tubes fitted with their closures. In a more or less general manner, they may apply to the manufacture of any head made of a plastic material that can be adapted to a receptacle with an arbitrary shape and made of an arbitrary material, provided with a distribution orifice surrounded by a neck and closed off by a cap. In the remainder of the text, the terms "closure" and "cap" are used synonymously, respectively for flexible tubes and for receptacles.

Normally, the cap and the head are made separately. Sooner or later, the cap will have to be fixed to the head, if only to protect the product contained in the receptacle and to prevent it from escaping. This is done for the first time under industrial fabrication conditions in which the receptacle is made, or while it is being filled with the product. The resulting closure must be kept hermetic before the first use. The same fixing means then have to be used several times throughout the product usage period.

In the case of flexible tubes made in large production series and at a high production rate such as tubes intended to contain and distribute toothpaste, complex automatic machines are used to screw the closure onto the head at the end of the fabrication line. These machines bring a closure adjacent to each head at a rate of several hundred per minute, the head being provided with a thread perfectly adapted to the head facing it, and then initiate rotation and translation of the head with respect to the closure. This automatic screw closure operation requires an investment in complex automatic machines and necessitates special preparation of the parts, dimensional checks and sorting, in order to limit the scrap rate.

Therefore, it is attempted to mould the closure directly onto the neck that surrounds the distribution orifice, in order to reduce the cost of the first fixing of the closure and the head. The global geometry of the external surface of the neck and the internal surface of the closure is cylindrical, or is preferably slightly tapered. The neck may or may not be fitted with temporary fixing means, depending on the conditions of use and guaranteed closure and leak tightness imposed in the tube.

Several tube-closure pairs can be obtained by using the method according to the invention. Some of these pairs are presented in the first three examples. The method is illustrated for making two possible variants of this type of tube. Example 3 presents the detail of the phases in the first variant. Example 4 shows the other variant.

The moulds that will be used for direct insert moulding of the closure on the neck can be adapted so as to make a tamper proof strip around the base of the neck, in all the examples given below for which the closure or the cap is fixed to the neck by screwing.

This type of process can also be used to make heads of tubes illustrated in examples 4 to 8 (FIGS. 2b, 5a, 5b, 6a, 7a and 7b) in application WO 97/46362.

EXAMPLE 1

Tube with Closure Overmoulded Directly on the Neck, not Provided with Screwing Means (FIG. 1)

In this first example shown in FIG. 1, the tube 1 is fitted with a head 10 composed of a shoulder 2 and a neck 3, the summit of which is drilled with a distribution orifice 4. The neck 3 does not have any sharp edges and the closure 5 is directly overmoulded by compression on the outside surface of the neck 3. The close contact of the surfaces of the closure 5 and the neck 3 on the common surface 11, obtained using the process according to the invention, enables a perfectly leak tight support of the closure 5 on the neck 3 throughout the tube usage period.

In this example, the neck and the closure are tapered, with a half angle at the summit of between 2° and 3°, but it is also possible to make them cylindrical with an elliptical orthogonal section in order to facilitate the final removal of the closure from its mould, with the small axis to large axis ratio remaining more than 0.9.

The simple contact between the neck 3 and the closure 5 over their common surface 11 holds the assembly in place, and therefore keeps the orifice closed off under satisfactory conditions, but all that is necessary to make the closure safer is to add a shoulder 6 to the base of the neck 3. During compression insert moulding, the upper angle of this shoulder 6 creeps, so that there is a slight reverse taper on its vertical wall 7. In a complementary manner, the inside face of the closure will include an internal relief at its end 8 which, associated with the said reverse tapered wall of the shoulder 7, enables an almost imperceptible click fit of the closure at the end of penetration and forms an obstacle to accidental opening of the closure, even after several uses.

This type of tube is very easy to use, aesthetic and is perfectly adapted to economic packaging samples for which a limited number of openings and closings is expected.

EXAMPLE 2

Tube Head with Overmoulded Closure made of a Plastic Material Enriched with Zinc Stearate In this second example, the neck is provided with a conventionally used screwing thread, composed of a single thread with a trapezoidal section and a spiral shape with more than 2 turns, usually 3 to 4 turns.

In this case, the cap is overmoulded with a plastic material comprising a sliding agent filler, such as zinc stearate. The unscrewing torque at mould removal is high but is acceptable for closures that the user can easily grip. Their external wall is provided with non-slip gripping means such as ribs, and their diameter is large, which multiplies applied unscrewing forces. It is better to use a half round section if the standard thread shape can be avoided.

EXAMPLE 3

Tube Head with Overmoulded Closure Provided with Short and Shallow Screw Threads (FIGS. 2 and 3.1, 3.2 and 3.3)

The third example is used to describe the process according to the invention applied to the tube head illustrated in FIG. 2, with reference to the different steps diagrammatically shown in FIGS. 3.1, 3.2 and 3.3.

FIG. 3.1 shows compression moulding of a tube head 10' made of a low-density polyethylene on a skirt 100 made of thermoplastic materials (it is actually a multi-layer skirt with a barrier layer). The skirt 100 is inserted around a punch 40 that forms the first tool, it then acts as an impression for making the internal wall of the head, in other words the internal wall of the neck 3' and the shoulder 2. The punch 40 is fitted with an appendix 42 above it that comes into contact with the upper tool 51, which is the second tool, to make the orifice 4.

The upper tool 51 defines the external surface of the neck 3' and the outer surface of the shoulder 2.

A low-density polyethylene dab 200 picked up at the exit from the extruder is deposited on the top of the punch. It is compressed by bringing the first and the second tools towards each other until the target shape of the head is obtained. The end of the shoulder 2 is closely welded onto the end of the skirt 100 during this operation.

The neck 3' thus formed in this example is provided with a short, conical, multiple, fast screwing thread 20 at the bottom of its tapered external wall, with a particular section, characterised by a low relief height equal to 0.3 mm. The gradient of the spiral is fairly steep, between 15° and 25°. The angular extent of the thread is only 30°; most of the surface of the neck is thus smooth, so that it has a clean appearance that the user finds particularly attractive due to aesthetic and hygienic reasons, since there is less risk of retention of the product distributed by the tube.

The second tool 51 is then moved away and the head 10' is held fixed to the punch 40. Without waiting for complete cooling of the head, a new dab 210 made of polypropylene is picked up at the exit from the extruder and is deposited on the polyethylene head formed during the previous step and that is still attached to the punch 40.

A third tool 55 is put into place facing the tube assembly fitted with its head and punch, thus trapping the polypropylene dab 210 (see FIG. 3.2). When the third tool moves towards the tube-punch assembly 110 and comes into contact with it, the impression of the said third tool 55, the outside surface of the neck 3' and the appendix 42 of the dab 40 delimit a thin volume occupied by the future closure 5'. A great deal of material can be saved with this process, because the closure can be half as thick as when it is made separately. In the event, in this example, the average thickness of the closure made is 0.7 mm.

When the tools (55, 3' and 52) are brought towards each other, the polypropylene dab 210 is compressed until the cap 5' is obtained (see FIG. 3.3). The cap is formed perfectly, with a screwing thread at the end of its skirt complementary to the screwing thread 20 of the neck 3'. Therefore, this thread is recessed, shallow (0.3 mm), has a steep gradient and there are multiple threads; this facilitates centring while the cap is being brought into place when reclosing.

These tools are moved apart and the assembly is extracted (see FIG. 3.4). The assembly is allowed to cool until the neck and the cap are dimensionally completely stable. This thus does not make it impossible to manipulate the assembly thus formed, for example to fill the tube with the product that it is designed to contain and distribute. The final user performs the final phase in removing the cap from its mould by performing the first opening, in a conventional manner without any difficulties since the unscrewing torque is low.

Close contact between the surfaces of the cap 5' and the neck 31 on the common surface 11' obtained using the process according to the invention, gives a perfectly leak tight support of the cap 5' on the neck 3' throughout the tube usage duration.

EXAMPLE 4

"Intracompression" Process in which the Tube Head is Compression Moulded Between a Punch and a Female Die Fitted with a Cap and Welded by an Autogenic Weld to One End of a Skirt Fitted Around the Punch (FIGS. 4.1 and 4.2).

The method in this example is different from the method in the previous example in that fewer steps are necessary to make the flexible tube. In this variant, the tube head itself is made second, rather than the closure.

FIGS. 4.1 and 4.2 show the female die 56 in the cavity in which a closure 51" (acting as the first moulded part) was put into place, and the punch 45 onto which a cylindrical flexible skirt 101 is force fitted. The end 102 of the skirt 101 projects slightly beyond the shoulder 46 formed on the punch 40 that acts as the third tool.

The average thickness of the closure 5" is 1 mm. The inside surface of the closure, possibly fitted with one or more screwing threads, defines the outer surface of the neck to be formed. The part of the impression of the female die 56 not covered by the closure defines the outside surface of the shoulder. The female die 56 acts as support tool, the shape of its cavity in the part on which the closure will be fitted being identical to the shape of the impression of the die that was used to mould the said closure 5".

A low-density polyethylene O-ring blank 201 taken at the outlet from the extruder is deposited in the cavity of the female die 56. It is compressed by bringing the punch and the die towards each other to obtain the required shape of the head. The blank 201 is deformed under the effect of this translation, and the plastic material flow is guided by the free surfaces of the air gap that gradually reduces in volume. When the punch 45 and the female die 56 are in contact with each other, they define a moulding cavity in which the end 102 of the skirt is trapped. Under the effect of compression, the plastic material of the blank flows and will fill in the different portions of the volume delimited by the impressions in the punch and the female die. In particular, it comes into contact with the end 102 of the skirt. The plastic materials from which the head and the skirt are made are closely welded to each other without any addition of heat or material. They remain welded together after keeping under low pressure and after cooling.

The tools are separated and the assembly is extracted. The assembly is allowed to cool so that the dimensions of the neck and the closure can stabilise.

This method, and particularly its variants described in the examples 3 and 4, may advantageously be implemented using devices in which the various compression moulding tools are driven by a continuous movement perpendicular to the direction in which they move towards each other. Devices of this type are also used for continuous compression moulding and are described in French patent application No. 01/03706. This patent discloses transfer means used to coat the punches with a flexible skirt. An additional means is used to feed female dies with closures. In general, the closures are made separately and are grouped in large numbers, and are then individually guided in a channel that opens up adjacent to the passage in which the continuously moving female dies advance, and drop into the female dies cavity by gravity.

Advantages

The overmoulded part obtained by compression does not have any marks related to injection. The injection process through cold ducts imposes the presence of sprue that has to be removed. This additional operation in the fabrication line of the tube is thus avoided; lower cost and no traces on the closure.

For large production series, injection may also be effected using hot ducts. This process is more complex and more expensive and leaves traces on the closure admittedly not as obvious as with the cold duct injection process.

Compression has an advantage for injection; it is more suitable for the production of a continuously moving fabrication line in which the caps will be made by compression of dabs between the tube fixed to a mobile punch and a third tool that is also mobile, accompanying the movement of the punch in a plane perpendicular to the direction in which the tools move towards each other. More generally, the second parts may be continuously moulded by compression of a blank made from a plastic material extruded between the first fixed part of the first tool and a third tool that is also free to move, the assembly of the first part fixed to the support tool and the third tool being continuously moved perpendicular to the direction of their closing movement.

When the blank is inserted in the gap between the first tool—first part and the third tool assembly at a temperature lower than the temperature used for injection, the temperature of the resulting assembly is generally lower, which reduces cooling times.

Injection imposes the presence of plastic supply ducts with a sufficiently large minimum diameter to be able to overcome the pressure loss without wasting too much energy; this imposes a minimum thickness of the injected part. With compression, thinner and therefore lighter parts can be obtained. The result is a saving of material.

The invention claimed is:

1. Method for fabricating objects or parts thereof formed of an assembly comprising at least two parts made of plastic materials which can move in relation to one another, with at least one degree of freedom and for which corresponding surfaces at least partially match with complementary shapes such that there is at least one geometric configuration in which the parts are solidly interconnected on a common surface in close, clearance-free contact, comprising the steps of:

a) injecting or compression molding a first part made of at least one plastic material by moving a first tool and a second tool towards each other, the second tool presenting an impression including the common surface, the combined impressions of the two tools delimiting the volume of the first part at the end of the moving;

b) separating the said second tool, with the first part fixed to the first tool which then acts as a support tool for the first part, the first tool and the first part forming thereby an assembly;

c) producing a blank by extruding at least one thermoplastic material, and removing a predetermined quantity of the at least one extruded thermoplastic material to form the blank, the plastic material at a periphery of the blank being immiscible with the plastic material at a periphery of the first part;

d) depositing the blank at a temperature higher than the softening temperature of said at least one thermoplastic material on the surface of the first part fixed to the first tool or in an impression of a third molding tool;

e) placing a third molding tool facing the assembly of the first part fixed to the first tool, the third tool having an impression that, when it comes into contact with the assembly of the first part fixed to the first tool, delimits the volume of a second part with the surface of the first part, and optionally a portion of the impression formed in the first tool;

f) moving the assembly of the first part and the first tool towards the third tool until the assembly and the third tool come into contact, the moving causing thereby compression of the blank until a required shape of the second part is obtained; and g) separating the first tool and the third tool and extracting an assembly of the two parts thus formed.

2. Method according to claim 1, additionally comprising the step of:

completely cooling and stabilizing the two plastic materials before the last mold removal of the second part comprising a relative displacement of one part or a portion of a part relative to the other part.

3. Method according to claim 1, wherein the periphery of the first part is made of a first plastic material and the periphery of the blank is made of a second plastic material, immiscible with the first plastic material.

4. Method according to claim 3, wherein the first and second plastic materials are a pair of materials selected from the group consisting of polypropylene-polyethylene, polyester polyethylene, polyester-polypropylene, polyamide-polypropylene, and polyamide-polyethylene.

5. Method according to claim 1, wherein the first part is molded from a single material that is the first plastic material.

6. Method according to claim 1, wherein the blank is extruded from a single material that is the second plastic material.

7. Method according to claim 1, wherein the blank is obtained by coextrusion of a plurality plastic materials, including a second plastic material surrounding a first plastic material with improved barrier properties.

8. Method according to claim 7, wherein the first plastic material is ethylene-vinyl alcohol copolymer or a polyamide.

9. Method according to claim 1, wherein at least one of the plastic materials comprises a filler.

10. Method according to claim 9, wherein the filler comprises calcium carbonate particles, mica particles or nanoparticles of clay.

11. Method according to claim 1, wherein the first or second plastic material comprises a sliding agent.

12. Method according to claim 1, wherein the first part is a tube head and the second part is a closure.

13. Method according to claim 1, wherein the first part is a tube closure and the second part is a tube head, the third tool is a punch around which a flexible skirt is force fitted, and the end of the flexible skirt projects into the molding cavity such that the plastic materials from which the head and the skirt are formed are intimately welded together without the need to add any heat or material.

14. Method according to claim 1, wherein a plurality of the second parts are continuously compression molded from a blank between a mobile assembly comprising the first part fixed to the support tool and a third tool that is also free to move, the molding tools being continuously moved perpendicular to the direction of their closing movement.

15. Method for fabricating objects or parts thereof formed of an assembly comprising at least two parts made of plastic materials which can move in relation to one another, with at least one degree of freedom and for which corresponding surfaces at least partially match with complementary shapes such that there is at least one geometric configuration in which the parts are solidly interconnected on a common surface in close, clearance-free contact, comprising the steps of:

a) injecting or compression molding a first part made of at least one plastic material by moving a first tool and a second tool towards each other, the second tool presenting an impression including the common surface, the combined impressions of the two tools delimiting the volume of the first part at the end of the moving;

b1) separating the first tool and the said second tool and extracting the first part;

b2) placing the first part on a support tool that has a contact surface with the first part mechanically equivalent to the contact surface that existed between the first tool and the first part, the placing being done on the support tool such that the common surface on the first part faces outward and can act as a mold for the second part.

c) producing a blank by extruding at least one thermoplastic material, and removing a predetermined quantity of the at least one extruded thermoplastic material to form the blank, the plastic material at a periphery of the blank being immiscible with the plastic material at a periphery of the first part;

d) depositing the blank at a temperature higher than the softening temperature of said at least one thermoplastic material on the surface of the first part fixed to the support tool or in an impression of a third molding tool;

e) placing a third molding tool facing the assembly of the first part fixed to the support tool, the third tool having an impression that, when it comes into contact with the assembly of the first part fixed to the support tool, delimits the volume of a second part with the surface of the first part, and optionally a portion of the impression formed in the first tool;

f) moving the assembly of the first part and the support tool towards the third tool until the assembly and the third tool come into contact, the moving causing thereby compression of the blank until a required shape of the second part is obtained; and g) separating the support tool and the third tool and extracting an assembly of the two parts thus formed.

* * * * *